United States Patent [19]

Milne

[11] 3,875,262

[45] Apr. 1, 1975

[54] STABILIZED ORGANOSOLS THROUGH THE INTER-REACTION OF FUNCTIONAL GROUPS ON THE STABILIZER AND DISPERSED POLYMERS

[75] Inventor: David G. Milne, Bryn Mawr, Pa.

[73] Assignee: E. I. du Pont de Nemours and Co., Wilmington, Del.

[22] Filed: Nov. 13, 1972

[21] Appl. No.: 305,882

Related U.S. Application Data

[63] Continuation of Ser. No. 28,221, is a continuation of Ser. No. 683,440, Nov. 16, 1967, abandoned.

[52] U.S. Cl............ 260/900, 260/30.2, 260/30.4 R, 260/30.4 N, 260/32.8 R, 260/32.8 N, 260/33.4 F, 260/33.4 R, 260/33.6 F, 260/33.6 UA, 260/836, 260/895, 260/898, 260/899, 260/901
[51] Int. Cl. ............................................ C08f 29/22
[58] Field of Search ............. 260/900, 876 R, 876 B

[56] References Cited
UNITED STATES PATENTS
3,232,903   2/1966   Schmidle et al. .................. 260/33.6

FOREIGN PATENTS OR APPLICATIONS
6,601,692   8/1966   Netherlands........................ 260/881
1,143,404   2/1969   United Kingdom................ 260/881

OTHER PUBLICATIONS

Bro et al., Endgroups in Tetrafluoroethylene Polymers, Journal of Poly. Sci., Vol. 38, pp. 289-295 (1959).

Sperati, et al., Fluorine-Containing Polymers, Fortschritte Der Hochpolymeren—Forschung, Vol. 2, pp. 465-495 (1961).

Primary Examiner—Murray Tillman
Assistant Examiner—C. J. Seccuro

[57] ABSTRACT

Stable dispersions of preformed synthetic organic polymers in organic liquids, stabilized by other preformed synthetic organic polymers attached to the dispersed polymer particles by the inter-reaction of functional groups. The dispersions are useful as coating compositions.

8 Claims, No Drawings

STABILIZED ORGANOSOLS THROUGH THE INTER-REACTION OF FUNCTIONAL GROUPS ON THE STABILIZER AND DISPERSED POLYMERS

This is a continuation, of application Ser. No. 28,221, filed on Apr. 16, 1970 which application is a continuation of application Ser. No. 683,440, filed on Nov. 16, 1967 which has been abandoned.

BACKGROUND OF THE INVENTION

This invention relates to stable dispersions of synthetic polymers in organic liquids. It is more particularly directed to dispersions (organosols) of preformed synthetic organic polymers in organic liquids, stabilized by other preformed synthetic organic polymers attached to the dispersed polymer particles by the inter-reaction of functional groups. These organosols are useful as coating compositions.

Paints based on organosol systems have been promoted in recent years because these systems can carry more solids than solution systems. This means more of the paint can be applied per "pass," which of course saves labor and time. These organosol systems, however, are not entirely satisfactory because polymer particles tend to settle from them quickly, and once settled are rather difficult to redisperse.

To solve this problem, many stabilizers have been suggested. One type of stabilizer is shown in Dutch Patent application No. 6,601,692. The stabilizers shown there are copolymers, graft copolymers, or polymers whose molecules bear pendant long-chain alkyl groups. These stabilizers, according to the Dutch Application, are attached to the dispersed polymer particles by the strong specific interaction between polar groups in the stabilizer and complementary polar groups in the dispersed polymer. The entire stabilizer molecule, or a soluble portion of it, then dissolves in the organic liquid medium, thereby holding the dispersed polymer in suspension.

According to the Dutch Application the only way such an organosol can be prepared is by a complicated and bothersome simultaneous in situ polymerization of the dispersed polymer-and the stabilizer monomers. I have found that stable organosols can be prepared far more simply if one uses preformed polymer particles and preformed stabilizers and brings them together so that their functional groups may inter-react.

My method is also far more versatile than the in situ method because it permits the selection of the dispersed polymer from a much larger class of polymeric materials; for example, it permits the preparation of perfluoroolefin polymer organosols, which cannot be prepared using the in situ method.

SUMMARY OF THE INVENTION

The Stabilzers

The stabilizers I use according to my invention are synthetic organic polymers bearing reactive functional groups on or pendant from their polymer chains. When I speak of a "synthetic organic" polymer, I mean a linear or branched homopolymer, a linear or branched random- or ordered copolymer, a graft copolymer or a block c polymer. The polymer can be an addition- or condensation polymer.

The reactive functional groups can be, for example, acid groups such as carboxyl, sulfonic or phosphoric acid groups; amine groups such as primary, secondary and tertiary aliphatic and aromatic amine groups; hydroxyl groups isocyanate groups; or nitro groups. The functional groups can also be ester groups derived from organic and inorganic acids or epoxide groups, or can be derived from heterocyclic aromatic bases such as vinyl pyridine or vinyl pyrrolidone.

The functional groups on or pendant from the stabilizer molecules inter-react with complementary functional groups on or pendant from the molecules of the polymer to be dispersed. When I say "inter-reaction of functional groups," I means a direct chemical bond like that resulting from the reaction between an isocyanate group and a hydroxyl group to form a urethane, or that resulting from the protolytic reaction between an acidic and a basic group. I define an "acidic" group as one with a tendency to lose a proton and a "basic" group as one with a tendency to add a proton. The protolytic reactions also include hydrogen bonding.

I usually prepare my polymeric stabilizers by copolymerizing monomers bearing functional groups with other ethylenically unsaturatd comonomers, using customary addition polymerization techniques. Illustrative of comonomers bearing functional groups are acrylic acid, methacrylic acid, diethylaminoethyl methocrylate aminoethyl vinyl ether, butylamino ethyl methacrylate, glycidyl methacrylate, hydroxyethyl methacrylate, 3-($\beta$-methacryloxyethyl)-2,2-spirocyclohexyloxazolidine and bis(diisocyanato ethyl)-fumarate. Stabilizers prepared in this way will contain 0.5–25 percent (by weight) of functional monomers, preferably 1–10 percent.

I have also found, however, that functional groups can be built into existing polymers by a post reaction such as that of ammonia with methyl methacrylate/-glycidyl methacrylate copolymers, or the hydrolysis of poly(vinyl acetate).

Some of my stabilizer molecules can carry functional groups as initiator residues. The presence of carboxyl groups on poly(methyl methacrylate) and perfluoroolefin polymers as initiator residues, or their presence because of the use of thioglycollic acid as a chain transfer agent, are examples of this.

Mixtures of stabilizers can be used.

The Dispersed Polymers

As a general matter, the dispersed polymer in my organosols can be any addition polymer or condensation polymer which can exist in particulate form and which bears functional groups on or pendant from the polymer chain. Mixtures of polymers can also be used.

These functional groups can exist on or be built into the dispersed polymer molecule in the same fashion as with stabilizer molecules. Dispersed polymers made by copolymerizing monomers bearing functional groups with other monomers will contain 0.10–100 percent of the functional monomer, preferably 0.5–100 percent.

The choice of a dispersed polymer is of course dictated by the intended use of the organosol. Illustrative of polymers which can be used are perfluoroolefin polymers such as polytetrafluoroethylene (molecular weight about 500,000) and tetrafluoroethylene/hexafluoropropylene copolymers; copolymers of vinyl monomers such as acrylis- and methacrylic acids, their amides, nitriles and esters with alkanols of 1–8 carbon atoms; copolymers of aromatic vinyl monomers such as styrene and vinyl toluene; polymers and copolymers of halogenated vinyl monomers such as vinyl fluoride, vinylidene fluoride, vinyl chloride and vinylidene chloride; polymers and copolymers of other vinyl monomers such as vinyl esters; and condensation polymers such as polyesters, polyethers, polyamides, polyimides, polyphenyls and polybenzamides.

they settle slightly, they can be easily redispersed by shaking them briefly.

The stabilizers I prefer for specific organosols are listed below:

| Dispersed Polymer | Stabilizer |
| --- | --- |
| Perfluoroolefin polymers | Acrylic polymers bearing —NH$_2$ groups |
| (a) TFE/HFP copolymers | (a) MMA/MESO copolymers |
| (b) PTFE | (b) do. |
| Polymers of vinyl monomers | Acrylic polymers with complementary groups |
| (a) copolymers of AA and MAA their amides, nitriles and esters, with other monomers bearing functional groups | (a) 2-EHA/AEVE<br>2-EHA/BAEMA<br>2-EHA/DEAM<br>2-EHA/GMA<br>2-EHA/FDI-X |
| (b) halogenated polymers<br>VF VF$_2$<br>VCl VCl$_2$ | (b)<br><br>2-EHA/AEVE |

MMA — methyl methacrylate
DEAM — diethylaminoethyl methacrylate
AEVE — aminoethyl vinyl ether
BAEMA — butylamino ethyl methacrylate
TFE — tetrafluoroethylene
HFP — hexafluoropropylene
PTFE — polytetrafluoroethylene
AA — acrylic acid
MAA — methacrylic acid BA — butyl acrylate
2EHA — 2-ethylhexyl acrylate
MESO — 3-($\beta$-methacryloxyethyl)-2,2-spirocyclohexyloxazolidine
VF — vinyl fluoride
VF$_2$ — vinylidene fluoride
VCl — vinyl chloride
VCl$_2$ — vinylidene chloride
GMA — lycidyl methacrylate
PDI-X — bis(diisocyanatoethyl) fumarate

The Organic Liquid

As a general matter, the organic liquids used for my organosols can be any which do not appreciably dissolve the dispersed polymer. The organic liquid must also not interfere with the organosols' intended use or be imcompatible with any adjuncts which may be added.

Illustrative of the organic liquids I find can be used satisfactorily are aromatic and aliphatic hydrocarbons such as benzene, toluene and naphthas; heterocyclic compounds such as N-methyl pyrrolidone, isophorone and tetrahydrofuran; ketones such as acetone and methylisobutyl ketone; esters such as ethyl acetate and cellosolve acetate; and alcohols such as butanol and isopropanol.

Preparation of the Organosols

Once the choice of polymer to be dispersed and organic liquid has been made, a stabilizer must be selected which bears reactive groups complementary to those of the polymer to be dispersed and which is soluble in the organic liquid used. By "soluble" I mean a stabilizer at least about 0.5 gram of which dissolves in 100 grams of the organic liquid being used, at room temperature, to form a single phase.

I then mix the particulate polymer to be dispersed, the stabilizer and organic liquid together, using enough of the polymer for the intended use and from 1 to 100 percent, by weight of the polymer, of the stabilizer. I then ball mill or sand grind this mixture for from 15 minutes to 72 hours. The resulting organosols are highly stable and resist settling for long periods. Should

Preparation of Coating Compositions

Coating compositions can be prepared directly from my organosols. In certain cases, it may be necessary to mix them, in the proper proportions, with conventional coalescing agents and plasticizers.

Conventional pigments can also be added to the coating compositions to enhance the aesthetic appeal of the finishes they give.

These coating compositions can be applied by customary techniques. The coating articles are then baked at a temperature and for a time sufficient to drive off the organic liquid and to coalesce the dispersed polymer particles and bond them to the substrate.

DESCRIPTION OF THE PREFERRED EMBODIMENTS

In the following examples, all parts are by weight.

EXAMPLE 1

A methyl methacrylate/MESO 95/5 copolymer is made by heating 1,500 parts of benzene to reflux temperature under nitrogen and then adding, over a 60–75 minute period, a mixture of 95 parts of methyl methacrylate, 5 parts of MESO and 5 parts of azobisisobutyronitrile. This mixture is refluxed for 60 minutes and the benzene is evaporated. The product is washed with methanol and then dried on a rotary evaporator.

EXAMPLE 2

The following materials were placed in a ball mill and milled for 12 hours:

| | |
|---|---|
| TFE/HFP (85/15 mol % copolymer) | 9.9 parts |
| MMA/MESO copolymer of Example 1 | 0.51 |
| Methyl isobutyl ketone | 30.51 |

The resulting dispersion of TFE/HFP copolymer resists settling.

The dispersion is stirred into a solution of 9.88 parts of a polyamide-imide resin* in 47.6 parts of N-methylpyrrolidone. Two parts of TiO$_2$ are then added, with stirring.

*Amoco AI-10, made and sold by The American Oil Co.

The resulting coating composition is sprayed on a suitably primed aluminum panel and baked at 400°F. for 30 minutes to give a durable surface with a low coefficient of friction.

A dispersion and a coating composition having substantially the same characteristics as those just prepared can be made by substituting the same amount of polytetrafluoroethylene (molecular weight about 500,000) for the tetrafluoroethylene/hexafluoropropylene copolymer.

Substantially similar dispersions and compositions can also be made by substituting one part of a 2-ethylhexyl acrylate/diethylaminoethyl methacrylate 95/5 copolymer, one part of a 2-ethylhexyl acrylate/butylaminoethyl methacrylate 95/5 copolymer or one part of a methyl methacrylate/aminoethyl vinyl ether 95/5 copolymer for the methyl methacrylate/MESO copolymer. These copolymers can be made by the method shown in Example 1 simply by using proper reactants.

EXAMPLE 3

A methyl methacrylate/methacrylic acid 95/5 copolymer is prepared by placing 186 parts of water, 0.5 part of sodium lauryl sulfate, 1 part of n-dodecyl mercaptan and 50 parts of methyl methacrylate in a resin kettle. The kettle is continuously flushed with nitrogen and the contents heated to 50°C. Ten parts of a solution of 0.27 parts of ammonium persulfate and 0.16 part of sodium bisulfite in 25.8 parts of water are then added.

The temperature of the reaction mass increases to 80°C. and then drops back to 56°C. after 20 minutes. An additional 45 parts of methyl methacrylate, 5 parts of methacrylic acid and 1 part of n-dodecyl mercaptan are then added over a 10-minute period. The temperature rises to 70°C., and at the end of the exotherm the mass is cooled and the resulting latex is dried in a vacuum oven and ball milled to give a fine powder.

A 2-ethylhexyl acrylate/aminoethyl vinyl ether 98/2 copolymer is prepared according to the method shown in Example 1 by using the proper reactants.

One-hundred parts of the methyl methacrylate/methacrylic acid 95/5 copolymer, 10 parts of the 2-ethylhexyl acrylate/aminoethyl vinyl ether 98/2 copolymer, 890 parts of a 50/50 mixture of VM and P naphtha and hexane and 500 parts of washed Ottowa sand are then placed in a jar and shaken on a paint mixer for 30 minutes. The sand is then separated by filtering the mixture through felt to give a dispersion of NMA/MAA copolymer which resists settling.

To this dispersion are then added 40 parts of TiO$_2$, 30 parts of butyl benzyl phthalate and 15 parts of butyl cellosolve acetate. After these components have been thoroughly stirred together, the mixture is sprayed on a primed aluminum panel and baked at 300°F. for about 30 minutes to give a white glossy finish.

EXAMPLE 4

A methyl methacrylate/hydroxyethyl methacrylate 95/5 copolymer is made according to the emulsion polymerization method shown in Example 3 by using proper reactants.

A 2-ethylhexyl acrylate/FDI-X 95/5 copolymer is made as follows: 200 parts of benzene and 95 parts of 2-ethylhexyl acrylate are mixed and heated to reflux temperature. After 15 minutes, the mixture is cooled and 5 parts of FDI-X, 1 part of azobisisobutyronitrile and 0.1 part of n-dodecyl mercaptan are added. This mixture is stirred and heated at reflux temperature for 4 hours. It is cooled to give a clear solution, which is then evaporated to dryness in air, and in the absence of mositure.

A dispersion of the MMA/HEMA copolymer is made by mixing 100 parts of the dry methyl methacrylate/hydroxyethyl methacrylate copolymer and 25 parts of the dry 2-ethylexyl acrylate/FDI-X copolymer in 375 parts of dry heptane and pebble milling and mixture for 12 hours.

EXAMPLE 5

An acrylonitrile/methacrylic acid 95/5 copolymer is made by placing 186 parts of water, 0.5 part of sodium lauryl sulfate, 1 part of n-dodecyl mercaptan and 50 parts of acrylonitrile in a resin kettle. The kettle is continually flushed with nitrogen and the contents then heated to 50°C.

Ten milliliters of an initiator solution of 0.27 parts of ammonium persulfate and 0.16 parts of sodium bisulfite in 25.8 parts of water are then added. The temperature of the reaction mass increases to 60°C. and then drops back to 50°C. after 20 minutes.

At the point, an additional 45 parts of acrylonitrile, 5 parts of methacrylic acid and 1 part of n-dodecyl mercaptan are added over a 10 minute period. The temperature of the reaction mass increases to 65°–70°C.

The reaction mass is then cooled and the resulting latex is evaporated to dryness in a vacuum oven and ball milled to give a fine powder of acrylonitrile/methacrylic acid copolymer.

One-hundred parts of this copolymer, 25 parts of the 2-ethylhexyl acrylate/aminoethyl vinyl ether 98/2 copolymer prepared in Example 3, 975 parts of heptane and 975 parts of washed Ottowa sand are then mixed together and sand ground. The sand is filtered off to give a stable dispersion of the acrylonitrile/methacrylic acid copolymer.

EXAMPLE 6

A stable dispersion of the invention is prepared by mixing together 20 parts of a vinyl chloride/vinyl acetate/maleic acid 86/13/1 terpolymer*, 4 parts of the 2-ethylhexyl acrylate/aminoethyl vinyl ether 95/5 copolymer prepared in Example 3 and 76 parts of heptane and then sand grinding the mixture.

*Made and sold by the Union Carbide Co. as VMCH.

The resulting dispersion resists settling.

EXAMPLE 7

A vinyl acetate/acrylic acid 97/3 copolymer is made according to the method shown in Example 3 by using the proper reactants.

This copolymer solution is freeze dried. Twenty parts of the product are then mixed with 4 parts of the 2-ethylhexyl acrylate/aminoethyl vinyl ether 98/2 copolymer prepared in Example 3 and 100 parts of hexane. The mixture is sand ground at 0°C. in a jacketed grinder to give a stable dispersion of the invention.

I claim:

1. Composition comprising organic liquid containing preformed perfluoroolefin polymer particles having attached therto 1-100 percent by weight thereof of other preformed synthetic organic polymers soluble in said liquid, said synthetic organic polymer being polymerized from at least one ethylenically unsaturated monomer and containing at least 0.5 to 25 percent by weight of an unsaturated monomer containing an amine functional group or a functional group which is convertible to an amine group the soluble-polymers being attached to the perfluoroolefin polymer particles by the interreaction of amine groups carried by said soluble polymers and carboxylic or sulfonic acid groups carried by said perfluoroolefin polymer particles, said perfluoroolefin polymer containing at least one carboxylic or sulfonic acid group per molecule.

2. Composition of claim 1 wherein said soluble polymer is a copolymer of ethylenically unsaturated monomer and at least one unsaturated monomer carrying at least one amine group per molecule.

3. Composition of claim 2 wherein said ethylenically unsaturated monomer that is not carrying amine groups is selected from the group consisting of esters of acrylic, methacrylic acid and mixtures thereof.

4. Composition of claim 1 wherein said perfluoroolefin polymer is selected from the group consisting of polyetetrafluoroethylene, copolymer of tetrafluoroethylene/hexafluoropropylene and mixtures thereof.

5. The composition of claim 4 wherein said soluble polymer is selected from the group consisting of (1) a copolymer formed from about 0.5-25 percent by weight of glycidyl methacrylate and about 99.5-75 percent by weight of at least one ester of acrylic acid or methacrylic acid, such copolymer being post reacted with ammonia and (2) a copolymer formed from about 0.5-25 percent by weight of at least one of the following monomers:
3-($\beta$-methacryloxyethyl)-2,2-spirocyclohexyloxazolidine, diethylaminoethyl methacrylate, butylaminoethyl methacrylate, aminoethyl vinyl ether and mixtures thereof and about 99.5-75 percent by weight of at least one ester of acrylic acid or methacrylic acid and (3) mixtures thereof.

6. Composition of claim 4 wherein said soluble polymer is selected from the group consisting of (1) a copolymer formed from about 0.5-25 percent by weight of glycidyl methacrylate and about 99.5-75 percent by weight of methyl methacrylate, such copolymer being post reacted with ammonia and (2) a copolymer formed from about 0.5-25 percent by weight of at least one of the following monomers:
3-($\beta$-methacryloxyethyl)-2,2-spirocyclohexyloxazolidine, diethylaminoethyl methacrylate, butylaminoethyl methacrylate, aminoethyl vinyl ether, and mixtures thereof and 99.5-75 percent by weight of methyl methacrylate and (3) mixtures thereof.

7. A method for stabilizing a dispersion, in an organic liquid, of preformed perfluoroolefin polymer particles bearing functional groups selected from the group consisting of carboxylic acid groups and sulfonic acid groups, said perfluoroolefin polymer containing at least one functional group per molecule, said method comprising bringing said particles into contact with 1-100% by weight thereof of other synthetic organic polymers, soluble in said liquid and bearing amine functional groups, under conditions in which the functional groups carried by the perfluoroolefin polymer and the functional groups carried by the soluble polymer interreact, said synthetic organic polymer being polymerized from at least one ethylenically unsaturated monomer and containing at least 0.5 to 25 percent by weight of an unsaturated monomer containing an amine functional group or a functional group which is convertible to an amine group.

8. The process of claim 6 wherein said soluble polymer is a copolymer formed from about 99.5-75 percent by weight of at least one ester of acrylic acid or methacrylic acid and about 0.5-25 percent by weight of at least one unsaturated monomer carrying at least one amine group per molecule.

* * * * *